(12) United States Patent
Filsfils et al.

(10) Patent No.: US 8,644,315 B2
(45) Date of Patent: Feb. 4, 2014

(54) LABEL DISTRIBUTION PROTOCOL LABEL FILTERING

(75) Inventors: Clarence Filsfils, Brussels (BE); Jim Guichard, New Boston, NH (US); Eric C. Rosen, Arlington, MA (US); Eric W. Osborne, Sutton, MA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 12/478,388

(22) Filed: Jun. 4, 2009

(65) Prior Publication Data

US 2010/0309919 A1   Dec. 9, 2010

(51) Int. Cl.
*H04L 12/28* (2006.01)
*H04L 12/56* (2011.01)

(52) U.S. Cl.
USPC .......................................... 370/392; 370/401

(58) Field of Classification Search
None
See application file for complete search history.

(56) References Cited

U.S. PATENT DOCUMENTS

| | | |
|---|---|---|
| 6,499,061 B1 | 12/2002 | Benayoun et al. |
| 6,512,768 B1 | 1/2003 | Thomas |
| 6,970,464 B2 | 11/2005 | Xu et al. |
| 7,023,808 B2 | 4/2006 | Ball et al. |
| 7,031,266 B1 | 4/2006 | Patel et al. |
| 7,046,786 B2 | 5/2006 | Liesenberg |
| 7,120,151 B1 | 10/2006 | Ginjpalli et al. |
| 7,243,161 B1 | 7/2007 | Tappan et al. |
| 7,286,529 B1 | 10/2007 | Thomas |
| 7,289,622 B1 | 10/2007 | Liesenberg |
| 7,319,699 B1 | 1/2008 | Provine et al. |
| 7,366,099 B2 | 4/2008 | Shand |
| 7,369,556 B1 | 5/2008 | Rekhter et al. |
| 7,428,213 B2 | 9/2008 | Vasseur et al. |
| 7,466,661 B1 | 12/2008 | Previdi et al. |
| 7,477,593 B2 | 1/2009 | Scudder et al. |
| 7,483,387 B2 | 1/2009 | Guichard et al. |
| 7,496,096 B1 | 2/2009 | Dong et al. |
| 7,508,772 B1 | 3/2009 | Ward et al. |
| 7,522,603 B2 | 4/2009 | Vasseur |
| 2005/0089047 A1* | 4/2005 | Ould-Brahim et al. .. 370/395.53 |
| 2005/0152333 A1* | 7/2005 | Smith ............................ 370/351 |
| 2005/0169270 A1* | 8/2005 | Mutou et al. .................. 370/390 |
| 2005/0177636 A1* | 8/2005 | Jamieson et al. ............. 709/226 |
| 2006/0034251 A1 | 2/2006 | Sivabalan et al. |
| 2006/0133265 A1* | 6/2006 | Lee ................................ 370/228 |
| 2006/0171323 A1 | 8/2006 | Qian et al. |
| 2006/0187937 A1 | 8/2006 | Townsley et al. |
| 2006/0221867 A1* | 10/2006 | Wijnands et al. ............. 370/255 |
| 2006/0245374 A1* | 11/2006 | Patel et al. ..................... 370/254 |
| 2006/0262735 A1* | 11/2006 | Guichard et al. ............. 370/254 |
| 2007/0058568 A1* | 3/2007 | Previdi et al. ................. 370/254 |
| 2007/0133568 A1* | 6/2007 | Qing et al. ..................... 370/397 |

(Continued)

OTHER PUBLICATIONS

"MPLS LDP—Local Label Allocation Filtering", Cisco Systems, Inc., San Jose, CA, Apr. 2008, 22 pages.

*Primary Examiner* — Suk Jin Kang
(74) *Attorney, Agent, or Firm* — Cesari and McKenna, LLP (57) ABSTRACT

In one embodiment, a device of a particular non-backbone routing domain in a computer network determines whether each of one or more routes is reachable within the particular non-backbone domain. The device may then generate a filtered set of label mappings having only those of the one or more routes reachable within the particular non-backbone domain. Accordingly, the device may advertise label mappings only of the filtered set to one or more neighboring devices.

21 Claims, 6 Drawing Sheets

(56) References Cited

U.S. PATENT DOCUMENTS

| | | | |
|---|---|---|---|
| 2007/0180104 A1* | 8/2007 | Filsfils et al. | 709/224 |
| 2007/0214275 A1* | 9/2007 | Mirtorabi et al. | 709/230 |
| 2007/0258447 A1* | 11/2007 | Raszuk et al. | 370/389 |
| 2008/0025309 A1 | 1/2008 | Swallow | |
| 2008/0101385 A1* | 5/2008 | Elias et al. | 370/401 |
| 2008/0144644 A1* | 6/2008 | Allan et al. | 370/401 |
| 2008/0155121 A1* | 6/2008 | Jamieson et al. | 709/242 |
| 2009/0016341 A1* | 1/2009 | Huang et al. | 370/389 |
| 2009/0073996 A1* | 3/2009 | Swallow et al. | 370/401 |
| 2010/0124231 A1* | 5/2010 | Kompella | 370/401 |

\* cited by examiner

LABEL DISTRIBUTION PROTOCOL LABEL FILTERING

TECHNICAL FIELD

The present disclosure relates generally to computer networks, and, more particularly, to enhancements of a Label Distribution Protocol (LDP).

BACKGROUND

The current practice for a router running Label Distribution Protocol (LDP) in downstream unsolicited mode with liberal label retention is to send all of its LDP label mappings to every LDP peer. While this avoids blackholing of traffic during failure events, it also distributes label mappings for routes that are not typically reachable via the advertising router, that is, the advertising router is not along the best path for the route and hence is not used for actual traffic forwarding. In certain large Service Provider networks, the above mentioned behavior presents a scaling challenge as the number of label mappings may become significantly large. Although the number of label mappings does not in and of itself present any issue, it does increase the processing load and memory used to store all of the information.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device of a particular non-backbone routing domain in a computer network determines whether each of one or more routes is reachable within the particular non-backbone domain. The device may then generate a filtered set of label mappings having only those associated with the one or more routes reachable within the particular non-backbone domain. Accordingly, the device may advertise label mappings only from the filtered set to one or more neighboring devices. Also, according to one or more embodiments herein, the device may be a non-backbone device, such as a provider edge (PE) device or provider (P) device, filtering outbound labels or a backbone border device (e.g., an ABR or L1/L2 router) that filters inbound labels.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
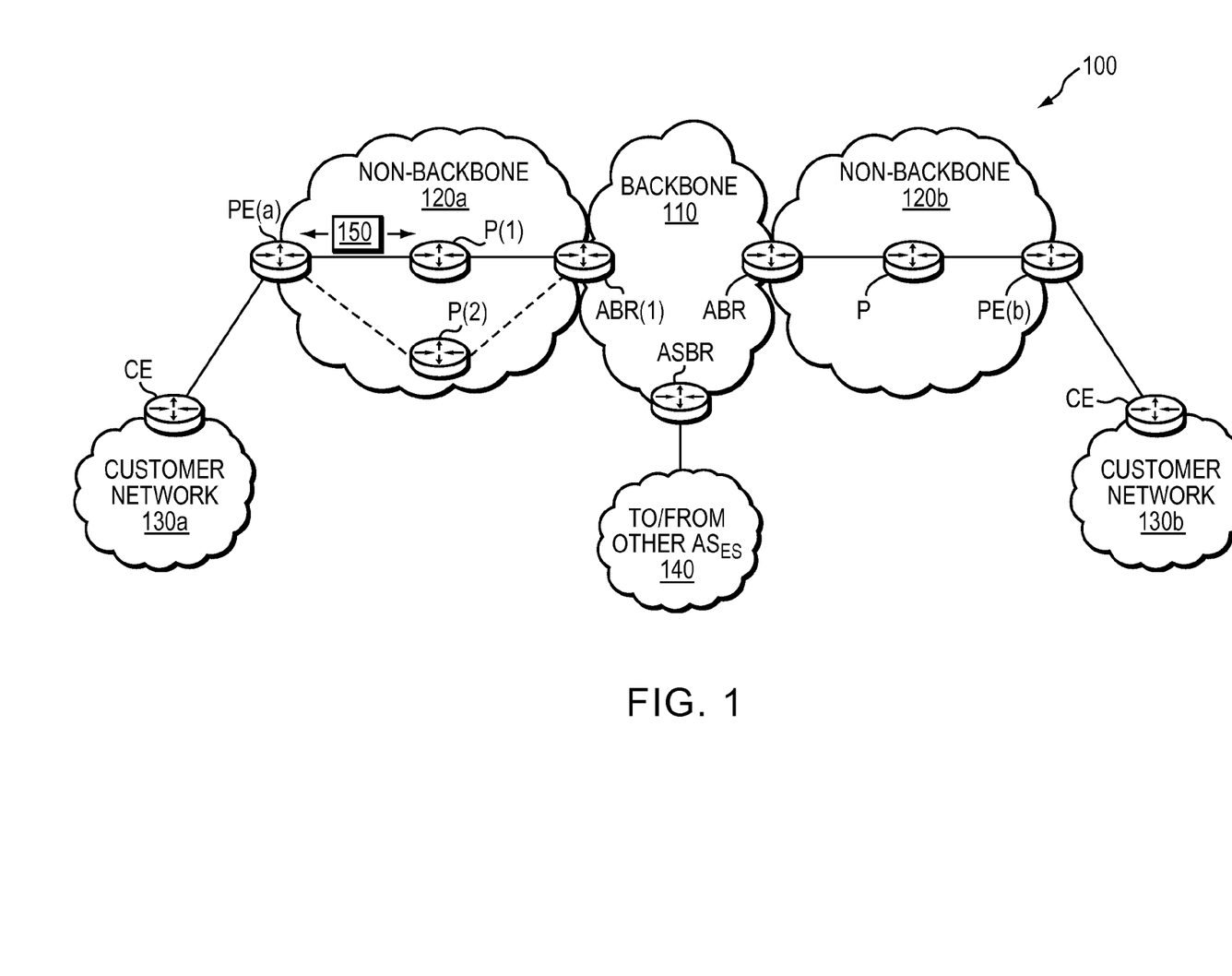
FIG. 1 illustrates an example computer network.

FIG. 1 is a schematic block diagram of an example computer network 100 illustratively comprising nodes/devices interconnected by links as shown. Illustratively, network 100 shows an arrangement of devices according to a typical service provider network model as will be understood by those skilled in the art. In particular, a service provider may manage an autonomous system that is connected through an AS border router (ASBR) to other ASes 140, and that is internally interconnected with a centralized "backbone" area/domain 110. The backbone domain 110 specifically interconnects one or more "non-backbone" areas/domains 120 (e.g., 120*a* and 120*b*, shown) to each other, as well as connecting those non-backbone areas to the other ASes 140. Located between the backbone and non-backbone networks are one or more border devices, such as an area border router (ABR). These ABRs may be interconnected with one or more provider edge (PE) devices (e.g., through one or more provider (P) devices), which provide connectivity to one or more customer networks (e.g., through one or more customer edge (CE) devices).

Those skilled in the art will understand that any number of nodes, devices, links, etc. may be used in the computer network, and that the view shown herein is for simplicity. Those skilled in the art will also understand that while the embodiments described herein is described generally in relation to terms according to Open Shortest Path First (OSPF), it may apply to any suitable network configuration having backbone networks and non-backbone networks. For example, other protocols such as the Intermediate-System-to-Intermediate- System (IS-IS) may be used, with level 2 (L2) backbone domains and level 1 (L1) non-backbone domains, interconnected via an "L1/L2 router" as will be appreciated by those skilled in the art.

Notably, as used herein, and as will be appreciated by those skilled in the art, a "backbone network" or "backbone domain" in terms of the underlying routing protocol is everything in area 0 (OSPF) and level-2 (IS-IS). The ABR (or L1/L2 router) is the interface between a non-backbone area and the backbone area. As such, a non-backbone area includes devices from the PE devices to the ABRs (i.e., PE devices, P devices, and ABRs), and everything between ABRs is within the backbone area. (Note that CE devices generally belong to the customer, and is not part of the service provider's domain. In the event, however, that CE devices are considered part of the service provider's non-backbone domain, then those skilled in the art will appreciate that the techniques described herein may, though need not, be applied at the CE devices as the actual "edge" of the provider network.) Also, as used herein, a "non-backbone attached" device described any device of a non-backbone area that is not attached directly to the backbone area (e.g., PE devices and P devices).

Data packets 150 (e.g., traffic/messages) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
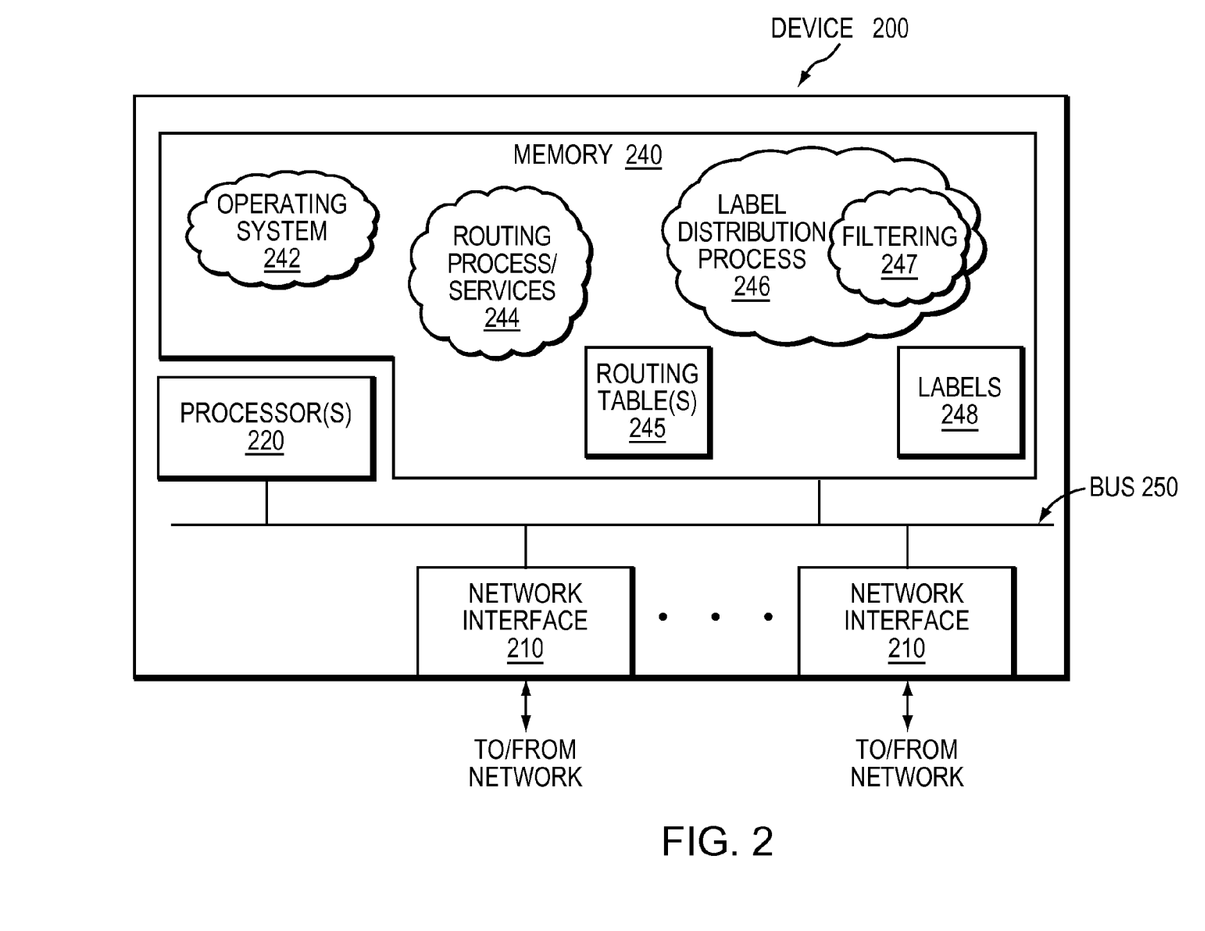
FIG. 2 illustrates an example network device/node.

FIG. 2 is a schematic block diagram of an example node/device 200 that may be advantageously used with one or more embodiments described herein, e.g., as a PE device, P device, or an ABR. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures, such as a routing table 245 and labels 248. An operating system 242 (e.g., the Internetworking Operating System, or IOS™, of Cisco Systems, Inc.), portions of which are typically resident in memory 240 and executed by the processor(s), functionally organizes the device by, inter alia, invoking network operations in support of software processes and/or services executing on the device. These software processes and/or services may comprise routing process/services 244 and label distribution process 246, as described herein. It will be apparent to those skilled in the art that other types of processors and memory, including various computer-readable media, may be used to store and execute program instructions pertaining to the inventive technique described herein.

Routing services 244 contain computer executable instructions executed by processor 220 to perform functions provided by one or more routing protocols, such as the Interior Gateway Protocol (IGP) (e.g., OSPF and IS-IS), the Border Gateway Protocol (BGP), etc., as will be understood by those skilled in the art. These functions may be configured to manage a routing table 245 and forwarding information database (not shown) containing, e.g., data used to make routing/forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching, etc., each as will be understood by those skilled in the art.

One such protocol that may be performed additionally by routing services 244, or more specifically, by label distribution process 246, is the Label Distribution Protocol, or "LDP." In particular, the path for a source-destination pair, termed a Label Switched Path (LSP) can be established according to various different approaches, such as LDP, in which each router in the path sends its label to the neighbor routers according to its routing table 245. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to it. A Label Information Base (LIB, or herein, simply "labels 248") stores the FEC, the next-hop information for the LSP, and the label required by the next hop.

As noted above, the current practice for a router running LDP in downstream unsolicited mode (i.e., sending labels without having been requested to) with liberal label retention (i.e., storing all of the received labels), is to send all of its LDP label mappings to every LDP peer. While this avoids blackholing of traffic during failure events, it also distributes label mappings for routes that are not typically reachable via the advertising router, that is, the advertising router is not along the IGP best path for the route and hence is not used for actual traffic forwarding.

Large numbers of label mappings can increase the processing load and memory needed to store all of the information, and this can present a challenge for certain nodes in the network. The problem is most acute on nodes which support a large number of LDP peers, such as ABR devices used as exit points in/out of the backbone domain (where PE devices directly attach) and routers supporting a large number of tunnels (e.g., RSVP-TE, where directed LDP is necessary, as will be understood by those skilled in the art). It is not unusual in either of these cases for the number of LDP peers to be in the several hundreds.

For instance, assume a scenario of 8,000 PE routers within a service provider's very large worldwide network, where each ABR supports approximately 300 PE devices, all of which require access to the /32 address of all other PE devices (so that the label switch paths are maintained). Given these numbers one can see that the ABR will receive 8000*300 label mappings (8000 from each PE device neighbor) resulting in 2.4 million label mappings. Note that only 300 of these 2.4 million label mappings are actually needed by the ABR in steady state (without topology changes) for traffic forwarding toward the locally attached PE devices. In particular, many of the label mappings are unnecessary at the ABR as the address prefix to which they belong is not reachable through the non-backbone network from which the label mappings are received. That is, PE(a) may be advertising labels for routes reachable via PE(b) at the other side of the network (i.e., upstream from ABR(1) from the perspective of PE(a)).

Filtered Label Distribution

According to one or more embodiments of the disclosure, a non-backbone attached device (e.g., PE device or P device) may filter outbound labels or a backbone attached border device (e.g., an ABR or L1/L2 router) may filter inbound labels during label distribution. Specifically, a "device," generically, of a particular non-backbone domain in a computer network determines whether each of one or more routes is reachable within the particular non-backbone domain. The device may then generate a filtered set of label mappings having only those associated with the one or more routes reachable within the particular non-backbone domain. Accordingly, the device may advertise label mappings (or store/use the labels in the case of a border device) only from the filtered set within the particular non-backbone domain.

Illustratively, the techniques described herein may be performed by hardware, software (e.g., stored on a tangible medium), and/or firmware, such as in accordance with a label distribution process 246, which may contain computer executable instructions executed by the processor 220 to perform functions relating to the novel techniques described herein. In certain embodiments, label distribution process 246 may be configured to operate in a conventional manner, and in this case operates in conjunction with an additional "filtering" process 247 to perform the specific filtering functions described herein. (Those skilled in the art will appreciate that the arrangement of processes is merely illustrative, and not meant to limit the scope of the disclosure.)

Generally, the PE devices store all known routes within routing table 245, and allocate labels (within labels or LIB 248) for all of the routes (that is, those reachable within their particular non-backbone domain and those not reachable within the particular domain). As noted, therefore, an automatic outbound LDP filter may be created at the PE devices (or P devices) or an inbound filter may be created at the ABRs that each may be used to filter anything which is not reachable within the non-backbone domain/area to which the PE device or ABR ("edge device") attaches. That is, the PE devices still allocate labels for all known routes, but when filtering is used according to techniques herein, only a smaller portion of those labels are sent to or used by the associated ABR (e.g., filtering out those labels for which the PE/P device is not a transit device that correspond to routes reachable within other non-backbone domains).

For outbound filtering at the PE devices (or, notably P devices), an automatic LDP filter may be built at the PE/P devices so that the label advertisements sent by the PE/P devices may only contain label bindings for routes which are contained within the non-backbone area to which the PE/P device attaches. In particular, the PE/P device (e.g., filtering process 247) may automatically compute a filter which it subsequently applies to label bindings and/or label transmissions. One example technique by which the filter may be generated is to examine the routing table 245 and look for routes that are indicated to be within or not within the particular domain. For example, the filter generation may permit label distribution for any route within the routing table that has a corresponding route type of "Intra-area," "static," or "connected," and deny everything else (i.e., determining that those routes so identified are reachable within the particular domain, and that those not identified as such as not reachable within the particular domain.) Alternatively (or in addition), the filter generation may deny label distribution for any route having a type of "Inter-area" or "External," and permit everything else (i.e., determining that those routes so identified are not reachable within the particular non-backbone domain, and that those not identified as such are reachable within the particular domain.)

Figure 3:
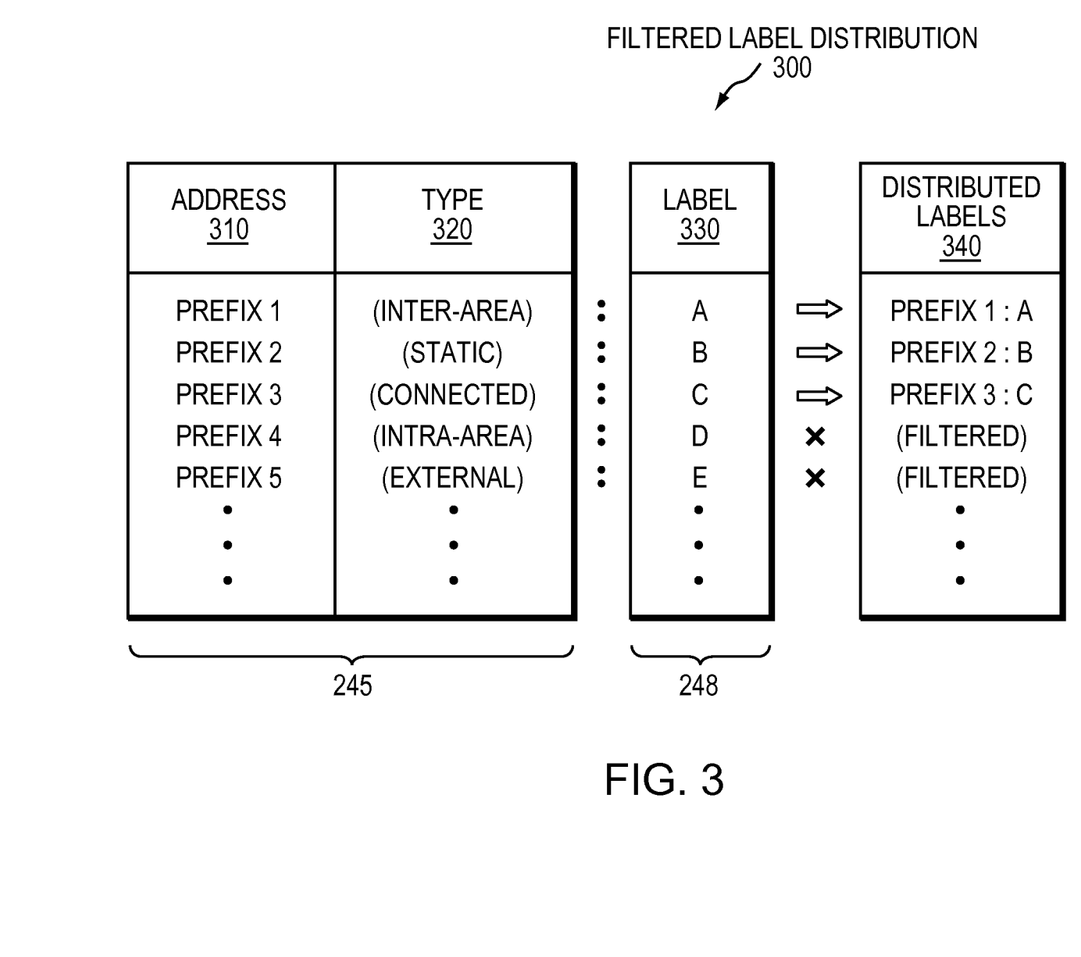
FIG. 3 illustrates an example representation of a label distribution.

FIG. 3 illustrates an example (and much simplified) representation of filtered label mappings in accordance with one or more techniques described herein. For example, a routing table 245 may illustratively comprise routes to one or more address prefixes 310 (e.g., prefixes 1-5) having associated route types 320 (e.g., as shown). These routes may be associated with certain allocated labels 330 (e.g., of labels or LIB 248) in a conventional manner (e.g., "A" through "E"). According to the techniques herein, then, once the filter has been applied to the allocated label mappings, the filtered labels that are actually to be distributed (340) is limited to those that correspond to routes reachable within the PE/P device's non-backbone domain to which it is attached (e.g., prefixes 1-3 and corresponding labels A-C).

Now that the filter has been generated to limit the labels that are to be distributed, the PE/P device may also determine to which neighboring devices, specifically, to advertise the labels. According to certain embodiments herein, the PE/P device should (e.g., to avoid any blackholing of traffic during a failure event) apply the filter to advertisements which are sent to either (a) the next-hop for a "reachable" route (within the PE/P device's domain), (b) an ABR (of the domain), or (c) the next-next-hop for a reachable route. In particular, next-hops "(a)" may be identified by looking at the next-hop contained within the routing table 245, and ABRs "(b)" may be identified by an "ABR" bit in the ABR's OSPF type-1 LSA (or its "attached" bit in an IS-IS level-1 LSP). The next-next-hops "(c)" (backup next-hops) may be identified during SPF computation. For instance, assume that the link between P(1) and ABR(1) fails, then PE(a) may have to go via P(2) to reach ABR(1). In this case P(2) becomes the next-hop for PE(a). However, since in steady state P(1) is the next-hop, P(2) is considered the "next-next-hop" as it should predictably become the next-hop should a failure cause P(1) to no longer be a valid next-hop for PE(a) to reach ABR(1).

Figure 4:
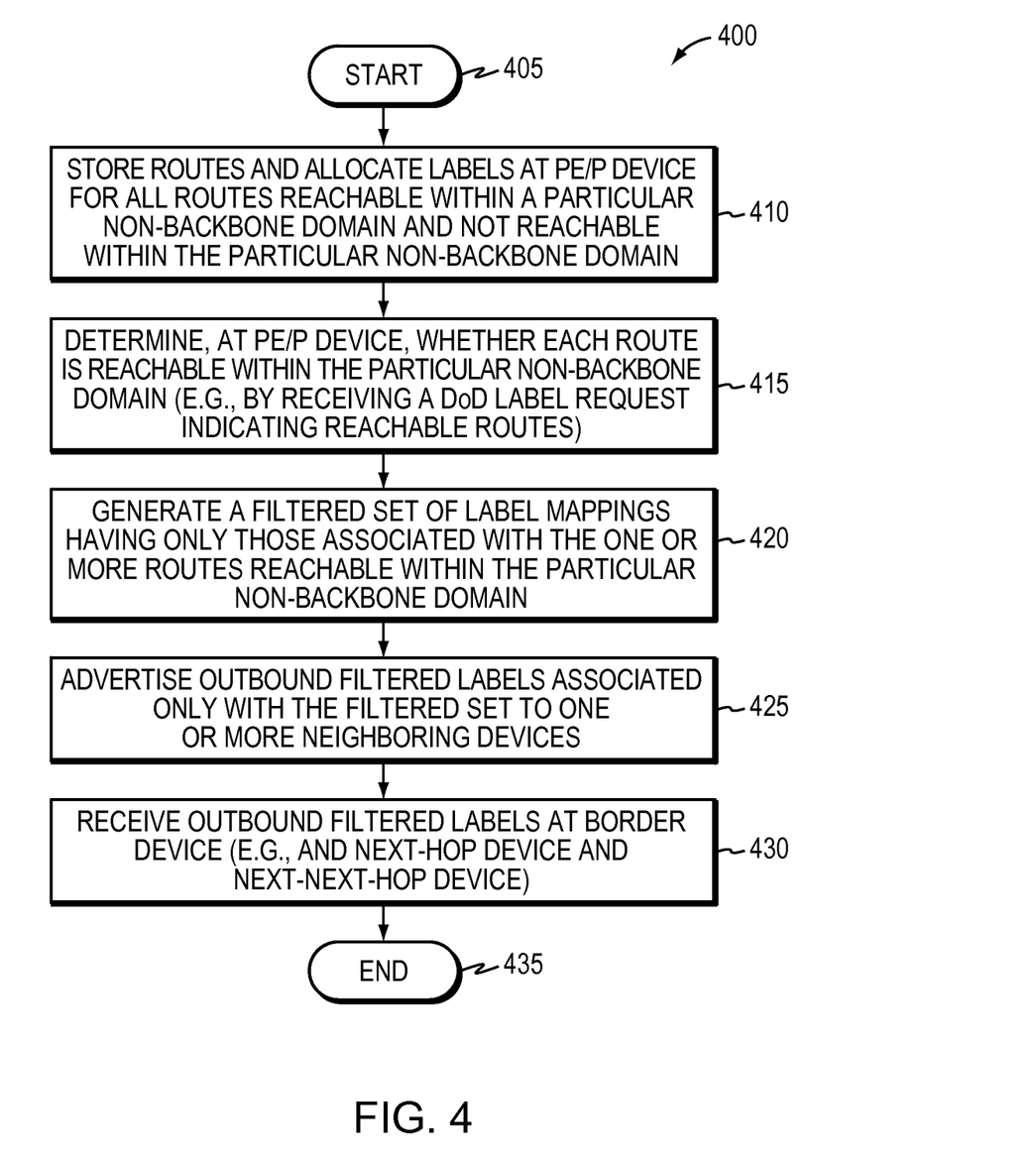
FIG. 4 illustrates an example procedure for outbound label distribution filtering.

FIG. 4 illustrates a simplified example procedure for performing outbound label filtering in accordance with one or more embodiments described herein. The procedure 400 starts at step 405, and continues to step 410, where a non-backbone attached device (e.g., PE(a)) stores routes and allocate labels for all routes, i.e., those reachable within its non-backbone domain and those not reachable within the particular domain. In step 415, the PE/P device may determine whether each route is reachable within the particular domain as described above (or, e.g., by receiving a "DoD label request" indicating reachable routes, as described further below), and in step 420 may generate a filtered set of label mappings having only those associated with the one or more routes reachable within the particular domain. Accordingly, in step 425, the PE/P device may advertise the outbound filtered labels associated only with the filtered set to one or more neighboring devices (e.g., next-hop, next-next-hop, or ABR), which in step 430 receive the outbound filtered labels. The procedure 400 ends in step 435.

Alternatively, automatic inbound LDP filtering may be performed at the border devices (e.g., ABRs or L1/L2 routers), which are within the non-backbone domain and the backbone domain. A border device (filtering process 247) may filter incoming label mappings received from PE/P devices by determining whether each of the received routes is reachable within the particular non-backbone domain and retaining labels for (and allocating/advertising labels for)

only those that are reachable within the particular domain. For instance, the border device (e.g., ABR) may identify routes in the routing table 245 that are marked as either OSPF type "inter-area" or "external," and may filter out any corresponding labels for such received routes.

Figure 5:
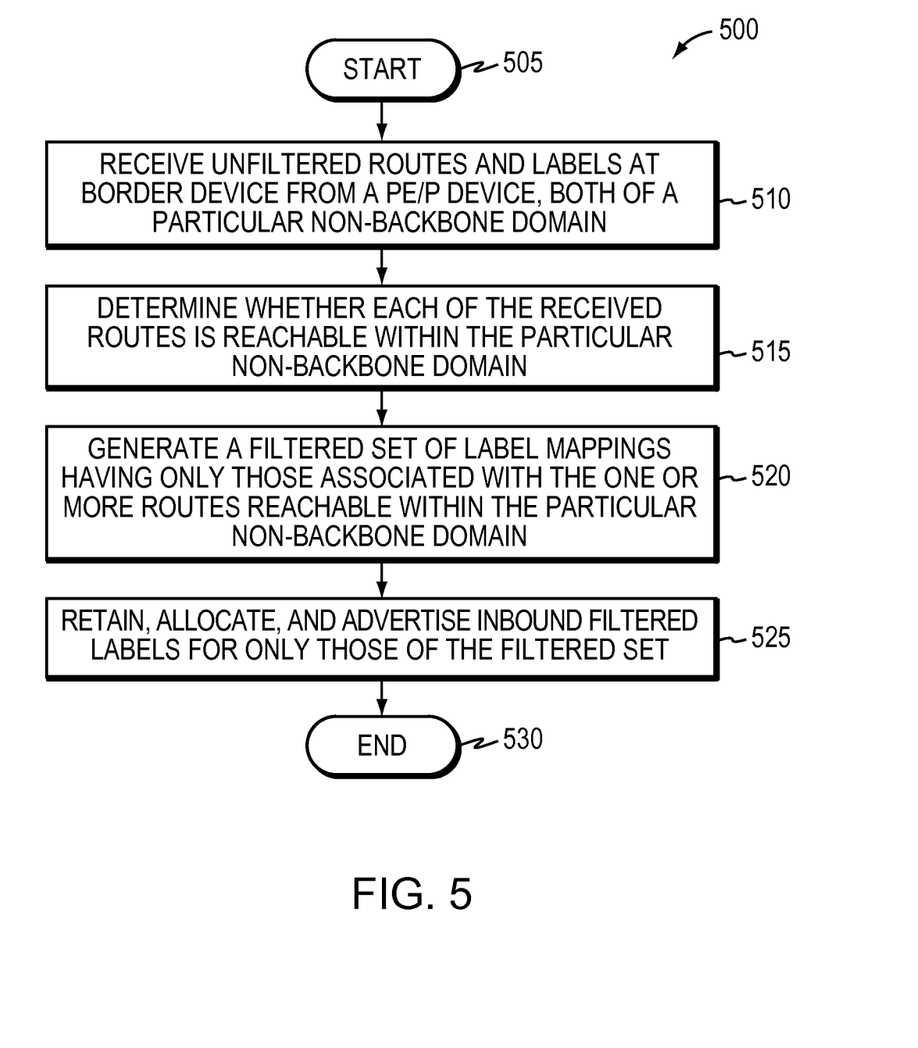
FIG. 5 illustrates an example procedure for inbound label distribution filtering.

FIG. 5 illustrates a simplified example procedure for performing inbound label filtering in accordance with one or more embodiments described herein. The procedure 500 starts at step 505, and continues to step 510, where the border device (e.g., ABR(1)) receives unfiltered routes and labels from a device (e.g., a PE device or P device) of a particular non-backbone domain. In step 515, the border device may determine whether each of the received routes is reachable within the particular non-backbone domain, and in step 520 generates a filtered set of label mappings having only those associated with the one or more routes reachable within the particular domain, as described above. Accordingly, in step 525, the border device may retain, allocate, and advertise inbound filtered labels for only those received routes reachable within the particular domain (i.e., of the filtered set), and the procedure ends in step 530.

Advantageously, the novel techniques described herein perform LDP label filtering in a computer network. By using automated LDP filter creation, the novel techniques allow for the prevention of the advertisement and/or processing/storing of a large number of LDP label mappings, resulting in a substantial reduction in the number of label mappings that must be either advertised or processed and stored (e.g., in many networks, a factor of at least 100 reduction). In particular, the techniques described above allow for either outbound filtering from the non-backbone attached devices (PE/P devices), or inbound filtering at the ABRs, such that in either case, all labels not reachable within (and thus not generally needed for) a particular non-backbone domain are filtered from distribution. Also, the dynamic aspects of one or more embodiments described herein alleviate the need for cumbersome and inefficient manual configuration. (For instance, while static configuration of LDP filters may be possible, this is a manual process, prone to error. Also, static configuration currently consists of the Service Provider having to maintain a per-PE/P-device view so as to build a filter which will only advertise labels for routes that may be used for traffic forwarding through the PE/P device during a failure situation.)

While there have been shown and described illustrative embodiments that perform LDP label filtering in a computer network, it is to be understood that various other adaptations and modifications may be made within the spirit and scope of the present disclosure. For example, the embodiments have been shown and described herein for use with certain protocols. However, the embodiments of the disclosure in their broader sense are not so limited, and may, in fact, be used with any suitable protocol. For instance, while LDP is generally known in the art as a standard protocol, any label distribution protocol ("LDP") may be used herein. Further, as noted above, while the techniques herein are often described with reference to OSPF terminology, they are equally applicable for networks running IS-IS. Specifically, in this situation, the device may determine that routes identified as level 1 (L1) routes are reachable within the particular domain, and that routes identified as level 2 (L2) routes are not reachable within the particular domain.

In addition, according to an alternative or additional embodiment, while the above description generally utilizes LDP's Downstream Unsolicited (DU) mode to distribute labels, a Downstream-On-Demand (DoD) mode may be used with additional intelligence (which, notably, may ameliorate the long-standing objection that DoD harms overall network convergence). In particular, LDP DoD requests a label for a prefix from neighbors if those neighbors are next-hops for that prefix. The problem with this is that if the next-hop changes as a result of a change in the network somewhere, LDP needs to request a label from that new next-hop in order to pass traffic through it, and this adds to network convergence time, which is unacceptable. This embodiment, then, not only uses DoD messages to request labels for the next-hop, but to request labels from a next-hop for all prefixes which could be behind that next-hop (e.g., manual configuration or through topological awareness).

Accordingly, an ABR may generate a DoD label request to transmit to the PE/P device that indicates which routes are reachable within the particular domain. Specifically, the DoD label request indicates routes that are reachable within the particular domain as either routes that are reachable behind the PE/P device or routes that have a possibility of being reachable behind the PE/P device (that is, routes for which the PE/P device is responsible for given a predictable topology change in the computer network). In this manner, the ABR generates the filtered label list for the PE/P device to return.

Figure 6:
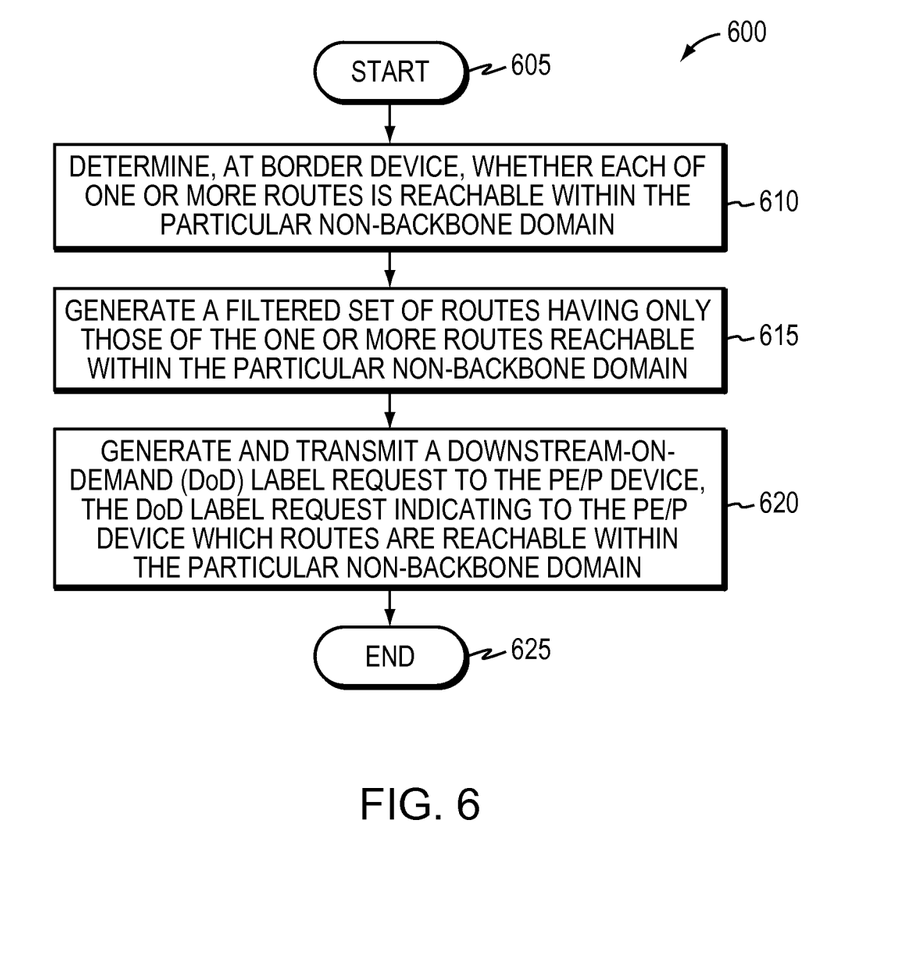
FIG. 6 illustrates an example procedure for downstream-on-demand (DoD) based label distribution filtering.

Briefly, then, FIG. 6 illustrates a simplified example procedure for DoD-based label filtering in accordance with one or more embodiments described herein. The procedure 600 starts at step 605, and continues to step 610, where a border device (e.g., ABR) determines whether each of one or more routes is reachable within the particular domain, as described above, and then in step 615 generates a filtered set of routes having only those of the one or more routes reachable within the particular domain. Then, in step 620, the device may generate and transmit a DoD label request to the PE/P device to indicate which routes are reachable within the particular domain (e.g., used in step 415 of FIG. 4 above), and the DoD procedure 600 ends in step 625. In this manner, the PE/P device should only transmit labels for the requested, i.e., filtered, routes.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:
1. A method, comprising:
  determining, at a device of a particular non-backbone domain in a computer network, whether each of one or more routes is reachable within the particular non-backbone domain, a route being considered reachable within the particular non-backbone domain when the route's Interior Gateway Protocol (IGP) best path passes within the particular non-backbone domain;
  filtering label mappings, at the device of the particular non-backbone domain, based on reachability within the particular non-backbone domain to
    remove label mappings associated with routes that are not reachable within the particular non-backbone domain, and maintain label mappings associated with routes that are reachable within the particular non-backbone domain, to generate a filtered set of label mappings having only those label mappings associated with the one or more routes whose IGP best path passes within the particular non-backbone domain; and advertising, by the device of the particular non-backbone domain, label mappings of the filtered set of label mappings to one or more neighboring devices, while not advertising one or more label mappings that are not of the filtered set to the one or more neighboring devices.

2. The method as in claim 1, wherein determining comprises:

determining that routes identified as one of an intra-area route, a static route, or a connected route are reachable within the particular non-backbone domain.

3. The method as in claim 1, wherein determining comprises:

determining that routes not identified as one of an intra-area route, a static route, or a connected route are not reachable within the particular non-backbone domain.

4. The method as in claim 1, wherein determining comprises:

determining that routes not identified as one of an inter-area route or an external route are reachable within the particular non-backbone domain.

5. The method as in claim 1, wherein determining comprises:

determining that routes identified as one of an inter-area route or an external route are not reachable within the particular non-backbone domain.

6. The method as in claim 1, wherein determining comprises:

determining that routes identified as level 1 (L1) routes are reachable within the particular non-backbone domain.

7. The method as in claim 1, wherein determining comprises:

determining that routes identified as level 2 (L2) routes are not reachable within the particular non-backbone domain.

8. The method as in claim 1, wherein the device is a provider edge (PE) device.

9. The method as in claim 8, further comprising:

allocating labels for all routes reachable within the particular non-backbone domain and not reachable within the particular non-backbone domain at the PE device.

10. The method as in claim 8, further comprising:

storing all routes reachable within the particular non-backbone domain and not reachable within the particular domain within a routing table at the PE device.

11. The method as in claim 8, wherein the neighboring devices are at least one of a border device of the particular non-backbone domain that is also part of a backbone domain, a next-hop device for the reachable routes, and a next-next-hop device for the reachable routes.

12. The method as in claim 1, wherein the device is a border device of the particular non-backbone domain that is also part of a backbone domain.

13. The method as in claim 12, further comprising:

receiving the routes from a provider edge (PE) device of the particular non-backbone domain, the received routes having corresponding labels; and filtering the labels by determining whether each of the received routes is reachable within the particular non-backbone domain and retaining labels for only those received routes reachable within the particular non-backbone domain.

14. The method as in claim 13, further comprising:

allocating and advertising labels for only those received routes reachable within the particular non-backbone domain.

15. The method as in claim 13, wherein the border device is one of either an area border router (ABR) or a level 1/level 2 (L1/L2) router.

16. The method as in claim 1, wherein determining comprises:

receiving a downstream-on-demand (DoD) label request at the device, the DoD label request indicating to the device which routes are reachable within the particular non-backbone domain.

17. The method as in claim 16, wherein the DoD label request indicates routes that are reachable within the particular non-backbone domain as one of either a first set of routes that are reachable behind the device or the first set of routes and a second set of routes that have a possibility of being reachable behind the device.

18. The method as in claim 17, wherein routes that have a possibility of being reachable behind the device are routes for which the device is responsible for given a predictable topology change in the computer network.

19. An apparatus, comprising:

one or more network interfaces adapted to communicate within a particular non-backbone domain in a computer network;

a processor coupled to the network interfaces and adapted to execute one or more processes; and a memory configured to store a label distribution process executable by the processor, the label distribution process when executed operable to:

determine whether each of one or more routes is reachable within the particular non-backbone domain, a route being considered reachable within the particular non-backbone domain when the route's Interior Gateway Protocol (IGP) best path passes within the particular non-backbone domain;

filter label mappings based on reachability within the particular non-backbone domain to remove label mappings associated with routes that are not reachable within the particular non-backbone domain, and maintain label mappings associated with routes that are reachable within the particular non-backbone domain, to generate a filtered set of label mappings having only those label mappings of the one or more routes whose IGP best path passes within the particular non-backbone domain; and advertise label mappings of the filtered set of label mappings to one or more neighboring devices, while not advertising one or more label mappings that are not of the filtered set to the one or more neighboring devices.

20. The apparatus as in claim 19, wherein the apparatus is one of either a provider edge (PE) device that filters outbound labels, a provider (P) device that filters outbound labels, or a border device of the particular non-backbone domain that is also part of a backbone domain and that filters inbound labels.

21. An apparatus, comprising:

means for determining whether each of one or more routes is reachable within a particular domain in which the apparatus operates, a route being considered reachable within the particular domain when the route's Interior Gateway Protocol (IGP) best path passes within the particular domain;

means for filtering label mappings based on reachability within the particular domain to
- remove label mappings associated with routes that are not reachable within the particular domain, and
- maintain label mappings associated with routes that are reachable within the particular domain, to
- generate a filtered set of routes having only those label mappings of the one or more routes whose IGP best path passes within the particular domain; and means for advertising labels associated with the filtered set of routes that are reachable within the particular domain to one or more neighboring devices, while not advertising one or more label mappings that are not of the filtered set to the one or more neighboring devices.

* * * * *